United States Patent
Ichikawa et al.

(10) Patent No.: US 12,141,322 B2
(45) Date of Patent: Nov. 12, 2024

(54) ANALYSIS QUERY RESPONSE SYSTEM, ANALYSIS QUERY EXECUTION APPARATUS, ANALYSIS QUERY VERIFICATION APPARATUS, ANALYSIS QUERY RESPONSE METHOD, AND PROGRAM

(71) Applicant: NIPPON TELEGRAPH AND TELEPHONE CORPORATION, Tokyo (JP)

(72) Inventors: Atsunori Ichikawa, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 587 days.

(21) Appl. No.: 17/413,578

(22) PCT Filed: Dec. 19, 2019

(86) PCT No.: PCT/JP2019/049849
§ 371 (c)(1),
(2) Date: Jun. 14, 2021

(87) PCT Pub. No.: WO2020/130082
PCT Pub. Date: Jun. 25, 2020

(65) Prior Publication Data
US 2022/0058290 A1 Feb. 24, 2022

(30) Foreign Application Priority Data
Dec. 20, 2018 (JP) .................................. 2018-238166

(51) Int. Cl.
G06F 21/62 (2013.01)
G06F 16/2452 (2019.01)

(52) U.S. Cl.
CPC ...... *G06F 21/6254* (2013.01); *G06F 16/2452* (2019.01); *G06F 21/6227* (2013.01)

(58) Field of Classification Search
None
See application file for complete search history.

(56) References Cited

U.S. PATENT DOCUMENTS 9,928,379 B1 * 3/2018 Hoffer .................... G16H 50/20
2011/0282865 A1 * 11/2011 Talwar .................. G06F 16/245
707/769

(Continued)

FOREIGN PATENT DOCUMENTS

CN 109977324 A * 7/2019
JP 2014-38524 A 2/2014

(Continued)

OTHER PUBLICATIONS

Mcsherry, "Privacy Integrated Queries: An Extensible Platform for Privacy-Preserving Data Analysis", In Proceedings of the 35th SIGMOD International Conference on Management of Data (SIGMOD), Jun. 29-Jul. 2, 2009, 12 pages.

(Continued)

*Primary Examiner* — Bassam A Noaman
(74) *Attorney, Agent, or Firm* — XSENSUS LLP

(57) ABSTRACT

An analysis query response system comprises a user terminal 1 that generates and transmits an analysis query, and a database apparatus 2 including an analysis query verification apparatus 22 that includes a verification execution part 222 that performs a first verification of whether the analysis query satisfies a predetermined privacy preservation indicator, and an analysis query execution apparatus 21 that includes a personal data storage part 211 that stores personal data and an analysis query execution and preservation part 214 that, in a case where the first verification is successful, performs an analysis corresponding to the analysis query on (Continued)

the personal data read from the personal data storage part to acquire an analysis result, and applies a predetermined privacy-preserving mechanism to the acquired analysis result.

4 Claims, 3 Drawing Sheets

(56) References Cited

U.S. PATENT DOCUMENTS

| | | | |
|---|---|---|---|
| 2015/0286827 A1* | 10/2015 | Fawaz | G06F 21/60 |
| | | | 726/26 |
| 2017/0093926 A1* | 3/2017 | Chan | H04L 63/205 |
| 2019/0141052 A1* | 5/2019 | Nerurkar | G06N 20/20 |

FOREIGN PATENT DOCUMENTS

| | | |
|---|---|---|
| WO | 2014/088903 A1 | 6/2014 |
| WO | 2016/203752 A1 | 12/2016 |
| WO | 2017/187207 A1 | 11/2017 |

OTHER PUBLICATIONS

Hou et al., "CASTLE: Enhancing the Utility of Inequality Query Auditing without Denial Threats", IEEE Transactions on Information Forensics and Security, vol. 13, No. 7, Jul. 2018, pp. 1656-1669.

* cited by examiner

ANALYSIS QUERY RESPONSE SYSTEM, ANALYSIS QUERY EXECUTION APPARATUS, ANALYSIS QUERY VERIFICATION APPARATUS, ANALYSIS QUERY RESPONSE METHOD, AND PROGRAM

CROSS-REFERENCE TO RELATED APPLICATIONS

The present application is based on PCT filing PCT/JP2019/049849, filed Dec. 19, 2019, which claims priority to JP 2018-238166, filed Dec. 20, 2018, the entire contents of each are incorporated herein by reference.

TECHNICAL FIELD

The present invention relates to a privacy-preserving query response technology capable of requesting analysis while also preserving the privacy of data.

BACKGROUND ART

Recently, interest in the utilization of various information is growing. Particularly, there is increasing demand to utilize personal data, that is, information closely related to individuals, in various fields such as commerce, medical care, and welfare.

On the other hand, utilizing personal data demands sufficient consideration for privacy, which refers to sensitive information included in personal data. Particularly, in the case of disclosing and providing analysis results such as statistics obtained from a plurality of personal data to another party, it is necessary to apply an appropriate privacy-preserving mechanism so that personal data cannot be deduced from the disclosed statistics.

Such methods of attaining both privacy preservation and data disclosure are collectively referred to as "privacy-preserving data publishing".

One model of privacy-preserving data publishing is called "privacy-preserving query response". This is a model comprising a database apparatus that saves a plurality of personal data and a user apparatus that requests analysis of the personal data. In privacy-preserving query response, first, the user apparatus creates a desired analysis query to perform on data in the database apparatus, and sends the analysis query to the database apparatus. The analysis query is written in some kind of programming language, for example.

The database apparatus executes the sent analysis query on data held in the database apparatus itself, applies a privacy-preserving mechanism to the analysis execution result according to a privacy preservation indicator preset in the database apparatus, and replies to the user.

Existing methods of achieving privacy-preserving query response include the methods in Non-patent literatures 1 and 2.

PRIOR ART LITERATURE

Non-Patent Literature

Non-patent literature 1: F. McSherry, "Privacy integrated queries: An Extensible Platform for Privacy-Preserving Data Analysis", In Proceedings of the 35th SIGMOD International Conference on Management of Data (SIGMOD), 2009.

Non-patent literature 2: J. Hou, X.-Y. Li, T. Jung, Y. Wang, and D. Zheng, "CASTLE: Enhancing the utility of inequality query auditing without denial threats", TIFS, 2018.

SUMMARY OF THE INVENTION

Problems to Be Solved By the Invention

In the privacy-preserving query response achieved in the related art, only calculations by library functions, which are standardized calculations implemented and maintained on the database apparatus side, and analysis queries achievable by combinations of library functions can be sent as queries.

If free-form analysis queries not dependent on library functions, such as analysis queries structured as combinations of basic calculations like the four basic arithmetic operations and equality comparisons, could be sent, a wider range of data utilization would be possible.

However, an increasing degree of freedom in crafting analysis queries also makes it easier to craft malicious analysis queries intended to infringe on the privacy of the data, and there is a possibility that applying an appropriate privacy-preserving mechanism in the database apparatus may become difficult as a result.

Consequently, the related art prevents privacy infringement by limiting the degree of freedom to only library functions and combinations thereof.

An object of the present invention is to provide an analysis query response system, an analysis query execution apparatus, an analysis query verification apparatus, an analysis query response method, and a program capable of responding to more free-form analysis queries than the related art.

Means to Solve the Problems

An analysis query response system according to an aspect of the invention comprises a user terminal that generates and transmits an analysis query, and a database apparatus including an analysis query verification apparatus that includes a verification execution part that performs a first verification of whether the analysis query satisfies a predetermined privacy preservation indicator, and an analysis query execution apparatus that includes a personal data storage part that stores personal data and an analysis query execution and preservation part that, in a case where the first verification is successful, performs an analysis corresponding to the analysis query on the personal data read from the personal data storage part to acquire an analysis result, and applies a predetermined privacy-preserving mechanism to the acquired analysis result.

Effects of the Invention

By providing the database apparatus with a verification function that verifies whether an analysis query satisfies a predetermined privacy preservation indicator, it is possible to respond to analysis queries that are more free-form than the related art.

DETAILED DESCRIPTION OF THE EMBODIMENTS

Figure 1:
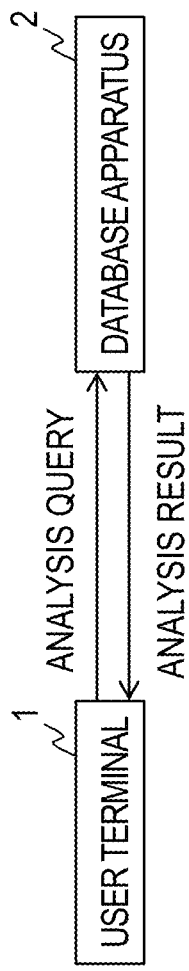
FIG. 1 is a diagram illustrating an example of a functional configuration of an analysis query response system.

Hereinafter, embodiments of the present invention will be described in detail. Note that structural elements having the same function are denoted with the same reference numerals in the drawings, and duplicate description of such elements is omitted.

Figure 3:
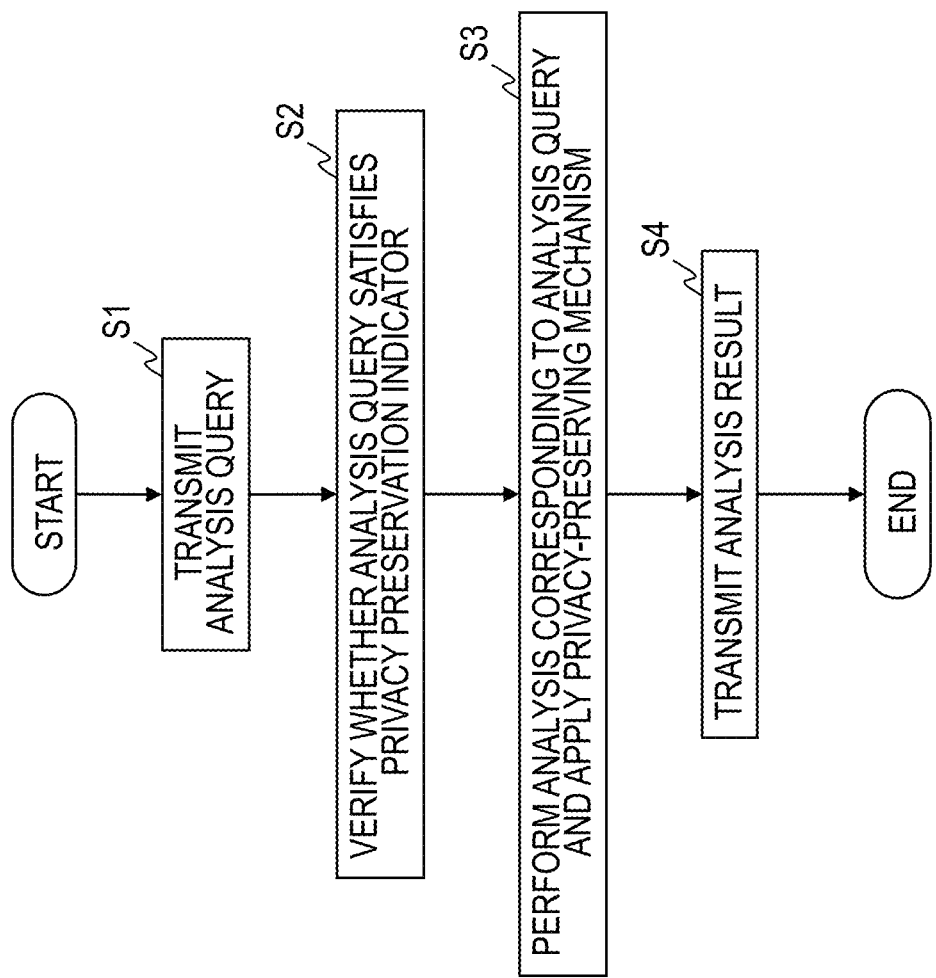
FIG. 3 is a diagram illustrating an example of a processing procedure in an analysis query response method.

As illustrated in FIG. 1 for example, an analysis query response system is provided with a database apparatus 2 that accumulates and saves a plurality of personal data, and a user terminal 1 which is a user apparatus that creates and transmits analysis queries to the database apparatus 2. As described later, the database apparatus 2 achieves a privacy-preserving query response to an arbitrarily created analysis query according to a predetermined privacy preservation indicator. The analysis query response method is achieved by, for example, causing the components of the analysis query response system to perform the process from step S1 to step S4 described in FIG. 3 and hereinafter.

The database apparatus 2 includes a storage function that stores personal data, a verification function that verifies that a received analysis query may satisfy a privacy preservation indicator, and a privacy-preserving mechanism function that performs an analysis query on the personal data and applies a privacy-preserving mechanism. The storage function is achieved by a personal data storage part 211. The verification function is achieved by a verification execution part 222. The privacy-preserving mechanism function is achieved by an analysis query execution and preservation part 214.

An analysis query is written in a programming language pre-specified by the database apparatus 2 in advance. In the database apparatus 2 and the user terminal 1, it is assumed that the execution environment of the programming language can be constructed.

In the embodiment to be described later, the related art "differential privacy" and "ACL2" (for example, see Reference literature 1) are used as the "privacy preservation indicator" and the "programming language", respectively. However, a programming language having theorem-proving functions equal to or exceeding ACL2 in capability may also be used as the programming language.

Reference literature 1: "User manual for the ACL2 Theorem Prover and the ACL2 Community Books", [online], [retrieved Dec. 13, 2018], Internet <URL: http://www.cs.utexas.edu/users/moore/acl2/v8-0/combined-manual/index.html>

Differential privacy is a privacy preservation indicator proposed by Reference literature 2, for example.

Reference literature 2: C. Dwork, "Differential privacy", In Proceedings of the International Colloquium on Automata, Languages and Programming (ICALP)(2), 112, 2006.

In the definition of the privacy preservation indicator, for a plurality of data sets D, a different data set ~D in which only one data element is different, and a parameter ε, when an analysis calculation q and a privacy-preserving mechanism M satisfy the inequality $Pr[M(q(D))=x] \leq e^{\varepsilon} Pr[M(q(\tilde{D}))=x]$, the analysis calculation q and the privacy-preserving mechanism M are considered to satisfy ε-differential privacy. The parameter ε represents a predetermined number close to 0, Pr represents probability, and e represents the natural logarithm.

The above inequality indicates that by applying the privacy-preserving mechanism M, the values q(D) and q(~D) obtained by inputting the two different data sets D and ~D into the analysis calculation q will be the same value x with a high probability. In other words, this means that it will be difficult to infer from the analysis result whether the original data of the analysis is D or ~D.

In differential privacy, many techniques of the related art exist for determining an appropriate privacy-preserving mechanism M depending on the "behavior" of the analysis calculation q. The "behavior" of the analysis calculation q is called the "sensitivity" in the context of differential privacy.

Particularly, the privacy-preserving mechanism $M(q(D))=q(D)+Lap(\delta_q/\varepsilon)$ using a parameter $\delta_q$ called "global sensitivity" and Laplace noise Lap is known to satisfy ε-differential privacy. Consequently, if the global sensitivity $\delta_q$ of q can be obtained for all analysis calculations q, it is possible to construct a privacy-preserving mechanism M. The global sensitivity can be obtained as $\delta_q = \max_{D, \tilde{D}} (|q(D)-q(\tilde{D})|)$, for example. The meaning of the global sensitivity $\delta_q$ is "the maximum value of the difference that may occur in the case where there is at most one change (D→~D) in the input data into q".

ACL2 is a programming language based on Common Lisp, and is a formal method and a theorem prover.

Like Common Lisp, ACL2 can be used to write functions that perform arbitrary calculations by combining basic calculations such as the four basic arithmetic operations. Also, with ACL2, a proof that a function "satisfies a certain property" can be written, and ACL2 is capable of verifying that the proof is correct.

The present embodiment preserves privacy appropriately and responds with an analysis result to an analysis query written in ACL2.

In the present embodiment, an initial value of the parameter ε that represents a privacy budget allowed by the database apparatus 2 is at first set individually in each user terminal 1. Also, a library function group and a library theorem group to provide to the user terminal 1 may be written in ACL2 in the database apparatus 2, as necessary.

<User Terminal 1>

The user terminal 1 generates and transmits an analysis query (step S1).

The analysis query is assumed to contain at least information about a function q that performs an analysis calculation. The analysis query is generated under a predetermined privacy preservation indicator and a predetermined programming language.

The user terminal 1 may additionally generate and transmit proof information, which is information related to a proof that the analysis query satisfies the predetermined privacy preservation indicator. In the case where the predetermined privacy preservation indicator is ε-differential privacy, the proof information may be proof information related to the global sensitivity of the analysis calculation corresponding to the analysis query. One example of the proof information is information about a proof that the global sensitivity of the function q satisfies the property $\delta_q \leq \Delta_q$. The proof information is written in a predetermined programming language such as ACL2 for example.

In the case where a library function group and a library theorem group provided by the database apparatus 2 exist, the analysis query and the proof information may also be written using the library function group and the library theorem group.

Furthermore, the user terminal 1 may additionally transmit a privacy quantity that is consumed by the analysis query. In the case where the predetermined privacy preservation indicator is ε-differential privacy, the privacy quantity is the parameter $\varepsilon_q$ for example.

Note that the user terminal 1 does not know the actual data D (and ~D and the like) on the database apparatus, and therefore is unable to compute the global sensitivity $\delta_q$ directly. For this reason, instead of D and ~D, the two of an input variable $X=(x_1, \ldots, x_n)$ of the function q and an input variable $\tilde{X}=(x_1, \ldots, x_i+d, \ldots, x_n)$ obtained by using a variable d to modify an arbitrary position i (where $1 \leq i \leq n$) of X are used to prove the property. In other words, if $|q(X)-q(\tilde{X})| \leq \Delta_d$ is satisfied for arbitrary X and ~X, then the same is also true when $(X, \tilde{X})=(D, \tilde{D})$, and therefore $\max(|q(D)-q(\tilde{D})|) \leq \Delta_d$ holds. Here, $\Delta_d$ may be a constant, or a function that takes d and X as input variables.

For example, in the case where the function q is the linear combination $q(X)=\Sigma_{1 \leq k \leq n} a_k x_k$, $q(\tilde{X})=(\Sigma_{1 \leq k \leq n, k \neq i} a_k x_k)+a_i(x_i+d)=(\Sigma_{1 \leq k \leq n} a_k x_k)+a_i d$ gives $|q(X)-q(\tilde{X})|=|a_i d| \leq |\max_i(a_i) \cdot d|$, and when d matches the width of the range of actual data, $\Delta_d=|\max_i(a_i) \cdot d|$ matches the global sensitivity of q. Here, $a_1, \ldots, a_n$ are predetermined numbers. Consequently, the user terminal 1 proves that $|q(X)-q(\tilde{X})| \leq |\max_i(a_i) \cdot d|$ for the variables X, ~X, and d.

For example, with this configuration, the user terminal 1 can generate proof information related to the global sensitivity of an analysis calculation corresponding to an analysis query that is unknown to the database apparatus 2, without knowing the actual personal data.

<Database Apparatus 2>

Figure 2:
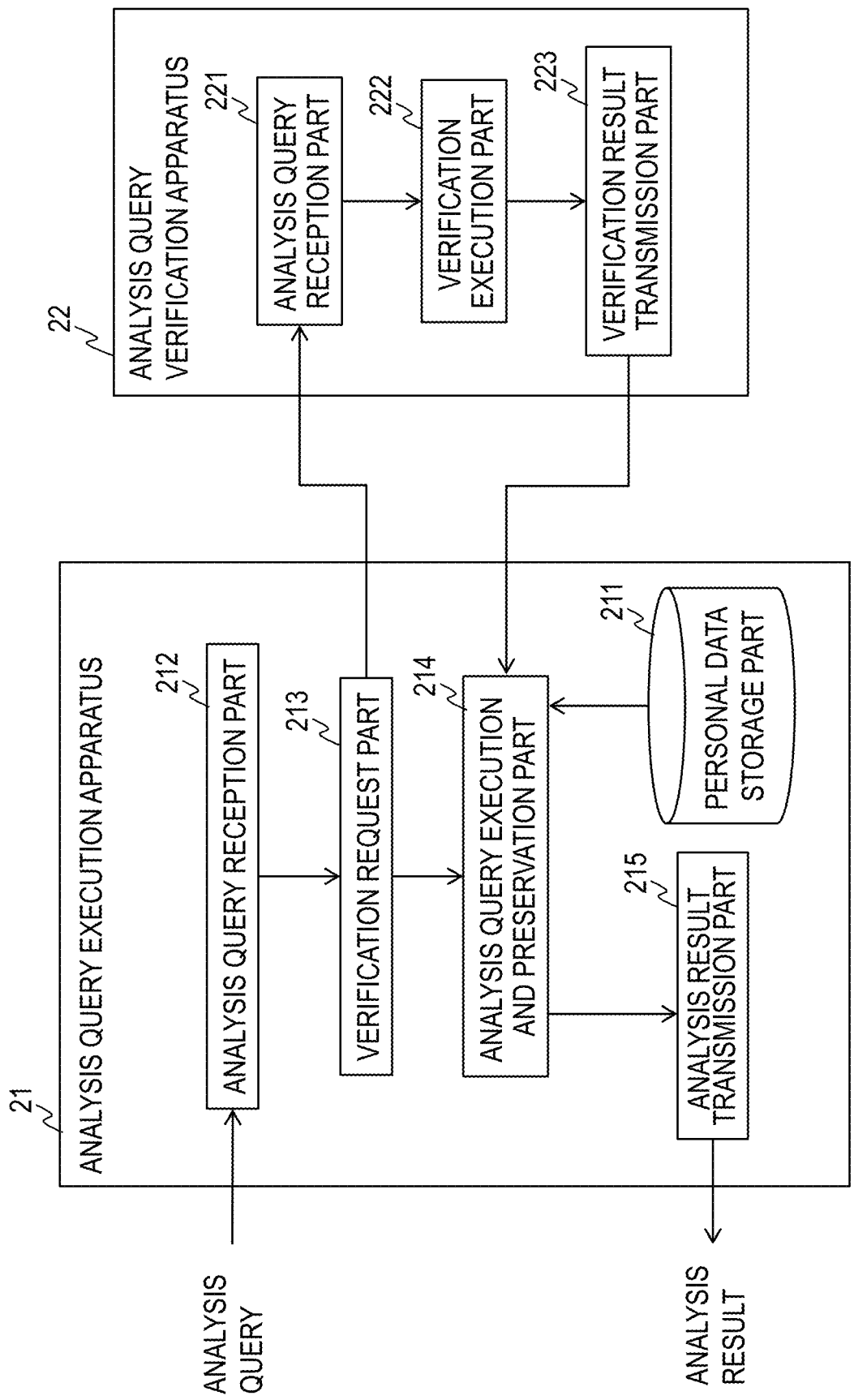
FIG. 2 is a diagram illustrating an example of a functional configuration of a database apparatus.

As illustrated in FIG. 2, the database apparatus 2 is provided with an analysis query execution apparatus 21 and an analysis query verification apparatus 22 for example.

The analysis query execution apparatus 21 is provided with a personal data storage part 211, an analysis query reception part 212, a verification request part 213, an analysis query execution and preservation part 214, and an analysis result transmission part 215.

The analysis query verification apparatus 22 is provided with an analysis query reception part 221, a verification execution part 222, and a verification result transmission part 223.

Personal data is stored in the personal data storage part 211. Personal data contains combinations of any information in any format, such as numerical values and character strings, for example.

The analysis query reception part 212 receives an analysis query transmitted by the user terminal 1. The analysis query reception part 212 outputs the analysis query to the verification request part 213.

The verification request part 213 outputs the analysis query and a verification request corresponding to the analysis query to the analysis query reception part 221 of the analysis query verification apparatus 22. Also, the verification request part 213 outputs the analysis query to the analysis query execution and preservation part 214.

The analysis query reception part 221 outputs the analysis query and the verification request corresponding to the analysis query to the verification execution part 222.

The verification execution part 222 receives the verification request corresponding to the analysis query and performs a first verification of whether the analysis query satisfies a predetermined privacy preservation indicator (step S2). The result of the first verification is output to the verification result transmission part 223.

Note that in the case where the user terminal 1 outputs proof information, the analysis query together with the proof information are input into the verification request part 213 through the analysis query reception part 212, the verification request part 213, and the analysis query reception part 221. In this case, the verification execution part 222 may use the proof information to perform the first verification of whether the analysis query satisfies the predetermined privacy preservation indicator. By using the proof information, the first verification can be performed more easily.

For example, the verification execution part 222 executes ACL2 to verify that a proof claimed by the user terminal 1 is correct regarding a property of an analysis calculation q corresponding to the analysis query.

The verification result transmission part 223 outputs the result of the first verification to the analysis query execution and preservation part 214.

The analysis query execution and preservation part 214 determines whether the first verification is successful on the basis of the result of the first verification, and discards the analysis query if the first verification is unsuccessful.

On the other hand, if the first verification is successful, the analysis query execution and preservation part 214 performs an analysis corresponding to the analysis query on personal data read from the personal data storage part to acquire an analysis result, and applies a predetermined privacy-preserving mechanism to the acquired analysis result (step S3).

For example, the analysis query execution and preservation part 214 applies a privacy-preserving mechanism by deriving an upper bound on the global sensitivity from the proven property of the analysis calculation q, generating noise v so as to satisfy $\varepsilon_q$-differential privacy, and adding the generated noise v to the analysis result q(D). In this case, the analysis result after applying the privacy-preserving mechanism is q(D)+v. The noise v may be generated as v=Lap$(\Delta_d/\varepsilon_q)$ as described above, or the noise v may be generated so as to satisfy $\varepsilon_q$-differential privacy according to another method.

Note that in the case where the user terminal 1 additionally transmits a privacy quantity that is consumed by the analysis query, the analysis query together with the privacy quantity are input into the analysis query execution and preservation part 214 through the analysis query reception part 212 and the verification request part 213.

In this case, the analysis query execution and preservation part 214 may additionally perform a second verification of whether the remainder of a predetermined privacy budget for the user terminal 1 exceeds the privacy quantity, and in the case where the first verification and the second verification are successful, the analysis query execution and preservation part 214 may perform an analysis corresponding to the analysis query on personal data read from the personal data storage part 211 to acquire an analysis result, and apply a predetermined privacy-preserving mechanism to the acquired analysis result.

In other words, for example, in the case where the first verification is successful, the analysis query execution and preservation part 214 compares the parameter $\varepsilon_q$ expressing the privacy quantity to be consumed to the parameter $\varepsilon$ expressing the privacy budget, and executes the analysis query only if $\varepsilon_q \leq \varepsilon$ holds.

Note that the parameter $\varepsilon$ expressing the privacy budget is updated by the remainder $\varepsilon - \varepsilon_q$ obtained by subtracting the consumed privacy quantity $\varepsilon_q$ from the parameter $\varepsilon$ expressing the privacy budget and saved.

The analysis result generated by the analysis query execution and preservation part 214 is output to the analysis result transmission part 215.

The analysis result transmission part 215 transmits the analysis result to the user terminal 1 (step S4).

According to the above, a privacy-preserving query response database apparatus for which analysis queries can be created more freely than the related art may be achieved.

[Modifications]

The foregoing describes embodiments of the present invention, but the specific configuration is not limited to these embodiments, and appropriate design modifications or the like within a scope that does not depart from the gist of the present invention obviously are to be included in the present invention.

The various processes described in the embodiments not only may be executed in a time series following the order described, but may also be executed in parallel or individually according to the processing performance of the apparatus executing the process, or as needed.

For example, data may be exchanged directly between the components of the analysis query response system, or through a storage part not illustrated.

[Program, Recording Medium]

In the case where the various processing functions in each of the apparatuses described above are achieved by a computer, the processing content of the functions to be included in each apparatus is stated by a program. Additionally, by causing a computer to execute the program, the various processing functions in each of the above apparatuses are achieved on the computer The program stating the processing content can be recorded to a computer-readable recording medium. The computer-readable recording medium may be any type of medium such as a magnetic recording apparatus, an optical disc, a magneto-optical recording medium, or semiconductor memory, for example.

Also, the program is distributed by selling, transferring, or lending a portable recording medium such as a DVD or CD-ROM disc on which the program is recorded, for example. Furthermore, the program may also be stored in a storage apparatus of a server computer and distributed by transferring the program from the server computer to another computer over a network.

The computer that executes such a computer first stores the program recorded on the portable recording medium or the program transferred from the server computer in its own storage apparatus, for example. Additionally, when executing processes, the computer loads the program stored in its own storage apparatus, and executes processes according to the loaded program. Also, as a different mode of executing the program, the computer may be configured to load the program directly from the portable recording medium and execute processes according to the program, and furthermore, every time the program is transferred to the computer from the server computer, the computer may be configured to execute processes according to the received program in succession. Also, a configuration for executing the processes described above may also be achieved by what is called an application service provider (ASP) type service, in which processing functions are achieved by an execution instruction and a result acquisition only, without transferring the program from the server computer to the computer. Note that the program in this mode is assumed to include accompanying information conforming to the program for processing by an electronic computer (such as data that is not direct instructions to the computer, but has properties that stipulate processing by the computer).

Also, in this mode, the apparatus is configured by causing the predetermined program to be executed on the computer, but at least a portion of the processing content may also be achieved in hardware.

DESCRIPTION OF REFERENCE NUMERALS 1 user terminal
2 database apparatus
21 analysis query execution apparatus
211 personal data storage part
212 analysis query reception part
213 verification request part
214 analysis query execution and preservation part
215 analysis result transmission part
22 analysis query verification apparatus
221 analysis query reception part
222 verification execution part
223 verification result transmission part

What is claimed is:

1. An analysis query response system comprising:
a user terminal that generates and transmits an analysis query, the analysis query including at least information about a function that performs an analysis calculation; and
a database apparatus including an analysis query verification apparatus that includes processing circuitry configured to perform a first verification of whether the analysis query satisfies a predetermined privacy preservation indicator, and an analysis query execution apparatus that includes processing circuitry configured to, in a case where the first verification is successful, performs an analysis corresponding to the analysis query on personal data read from a personal data memory that stores personal data to acquire an analysis result, and apply a predetermined privacy-preserving mechanism to the acquired analysis result,
wherein:
the user terminal generates the analysis query under the predetermined privacy preservation indicator and a predetermined programming language,
the processing circuitry of the analysis query execution apparatus is configured to discard the analysis query in a case where the first verification is unsuccessful,
the user terminal additionally generates and transmits proof information, the proof information being information related to a proof that the analysis query satisfies the predetermined privacy preservation indicator,
the processing circuitry of the analysis query verification apparatus is configured to use the proof information to perform the first verification of whether the analysis query satisfies the predetermined privacy preservation indicator,
the predetermined privacy preservation indicator is $\varepsilon$-differential privacy.

2. The analysis query response system according to claim 1, wherein:
the proof information is proof information related to a global sensitivity of the analysis calculation corresponding to the analysis query,
the user terminal additionally transmits a privacy quantity that is consumed by the analysis query,
the processing circuitry of the analysis query execution apparatus is configured to further perform a second verification of whether a remainder of a predetermined privacy budget for the user terminal exceeds the privacy quantity, and in a case where the first verification and the second verification are successful, the processing circuitry of the analysis query execution apparatus is configured to further perform an analysis corresponding to the analysis query on the personal data read from the personal data memory to acquire an analysis result, and applies a predetermined privacy-preserving mechanism to the acquired analysis result, and the processing circuitry of the analysis query execution apparatus is configured to further discard the analysis query in a case where either of the first verification and the second verification is unsuccessful.

3. An analysis query response method, comprising:

a user terminal generating and transmitting an analysis query, the analysis query including at least information about a function that performs an analysis calculation;

performing a first verification of whether the analysis query satisfies a predetermined privacy preservation indicator; and performing, in a case where the first verification is successful, an analysis corresponding to the analysis query on personal data read from a personal data memory storing the personal data to acquire an analysis result, and applying a predetermined privacy-preserving mechanism to the acquired analysis result, the method further comprising:

generating, by the user terminal, the analysis query under a predetermined privacy preservation indicator and a predetermined programming language, discarding the analysis query in a case where the first verification is unsuccessful, and generating and transmitting proof information, the proof information being information related to a proof that the analysis query satisfies the predetermined privacy preservation indicator, and using the proof information to perform the first verification of whether the analysis query satisfies the predetermined privacy preservation indicator, wherein the predetermined privacy preservation indicator is 8-differential privacy.

4. A non-transitory computer readable medium that stores a program for causing a computer to perform a method, comprising: a user terminal generating and transmitting an analysis query, the analysis query including at least information about a function that performs an analysis calculation;

performing a first verification of whether the analysis query satisfies a predetermined privacy preservation indicator; and performing, in a case where the first verification is successful, an analysis corresponding to the analysis query on personal data read from a personal data memory storing the personal data to acquire an analysis result, and applying a predetermined privacy-preserving mechanism to the acquired analysis result, the method further comprising:

generating, by the user terminal, the analysis query under the predetermined privacy preservation indicator and a predetermined programming language, discarding the analysis query in a case where the first verification is unsuccessful, generating and transmitting proof information, the proof information being information related to a proof that the analysis query satisfies the predetermined privacy preservation indicator, using the proof information to perform the first verification of whether the analysis query satisfies the predetermined privacy preservation indicator, and the predetermined privacy preservation indicator is $\varepsilon$-differential privacy.

* * * * *